(12) United States Patent
Meguro (10) Patent No.: US 11,597,237 B2
(45) Date of Patent: Mar. 7, 2023

(54) TIRE

(71) Applicant: SUMITOMO RUBBER INDUSTRIES, LTD., Hyogo (JP)

(72) Inventor: Yuya Meguro, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 176 days.

(21) Appl. No.: 16/681,845

(22) Filed: Nov. 13, 2019

(65) Prior Publication Data
US 2020/0171888 A1   Jun. 4, 2020

(30) Foreign Application Priority Data
Dec. 4, 2018 (JP) .............................. JP2018-227415

(51) Int. Cl.
*B60C 11/11* (2006.01)
*B60C 11/13* (2006.01)
*B60C 11/03* (2006.01)

(52) U.S. Cl.
CPC ... *B60C 11/1369* (2013.01); *B60C 2011/0346* (2013.01); *B60C 2011/0365* (2013.01); *B60C 2011/0367* (2013.01); *B60C 2011/0369* (2013.01)

(58) Field of Classification Search
CPC ......... B60C 11/1369; B60C 2011/0365; B60C 2011/0369
See application file for complete search history.

(56) References Cited

U.S. PATENT DOCUMENTS

| 5,814,169 A | * | 9/1998 | Yamaguchi | B60C 11/11 152/209.22 |
| 2005/0126670 A1 | * | 6/2005 | Godefroid | B60C 11/0316 152/209.22 |

(Continued)

FOREIGN PATENT DOCUMENTS

| CA | 2064405 A | * | 10/1993 |
| DE | 102010016978 A1 | * | 11/2011 |

(Continued)

OTHER PUBLICATIONS

Yoda, JP-10278513-A Machine Translation (Year: 1998).*

(Continued)

*Primary Examiner* — Steven D Maki
(74) *Attorney, Agent, or Firm* — JCIPRNET (57) ABSTRACT

A tire includes a tread formed with: circumferential grooves extending continuously in a tire circumferential direction; lateral grooves connecting the circumferential grooves in a tire axial direction; and blocks divided by the circumferential grooves and the lateral grooves. In the lateral groove, a groove bottom is raised to form a tie bar connecting the blocks in the tire circumferential direction. The tie bar is formed with a groove portion penetrating the tie bar in the tire axial direction. In a state where the tire is assembled to a regular rim, filled with a regular internal pressure, loaded with a regular load, and contacting a flat surface at a camber angle 0°, a side wall formed on the tie bar by the groove portion on one side in the tire circumferential direction does not contact a side wall on the other side in the tire circumferential direction.

10 Claims, 5 Drawing Sheets

(56) References Cited

U.S. PATENT DOCUMENTS

| | | | | |
|---|---|---|---|---|
| 2006/0090828 A1* | 5/2006 | Yamane | ................ | B60C 11/042 |
| | | | | 152/209.18 |
| 2008/0053585 A1* | 3/2008 | Ohara | ................ | B60C 11/0306 |
| | | | | 152/209.25 |
| 2018/0345734 A1* | 12/2018 | Mori | .................. | B60C 11/1369 |

FOREIGN PATENT DOCUMENTS

| | | | | | |
|---|---|---|---|---|---|
| JP | 06024212 | A | * | 2/1994 | |
| JP | 10278513 | A | * | 10/1998 | ......... B60C 11/1369 |
| JP | 2000-038010 | A | * | 2/2000 | |
| JP | 2014162259 | | | 9/2014 | |

OTHER PUBLICATIONS

Boehm, DE-102010016978-A1 (Year: 2011).*
Machine translation for German 102010016978 (Year: 2021).*
Machine translation for Japan 2000-038010 (Year: 2022).*

* cited by examiner

TIRE

CROSS-REFERENCE TO RELATED APPLICATION

This application claims the priority benefit of Japan Application No. 2018-227415, filed on Dec. 4, 2018. The entirety of each of the above-mentioned patent applications is hereby incorporated by reference herein and made a part of this specification.

BACKGROUND

Technical Field

The disclosure relates to a tire with a tread.

Description of Related Art

A tire which has a tie bar in a lateral groove extending in the tire axial direction has been known (see Patent Document 1, for example).

However, formation of the tie bar in the lateral groove may affect the mud performance of the tire on muddy ground, and there has been hope of further improvement.

RELATED ART

Patent Document

[Patent Document 1] Japanese Laid-Open No. 2014-162259

SUMMARY

The disclosure provides a tire including a tread. The tread includes: a plurality of circumferential grooves extending continuously in a tire circumferential direction; a plurality of lateral grooves connecting the circumferential grooves that are adjacent to each other in a tire axial direction; and a plurality of blocks divided by the circumferential grooves and the lateral grooves. In the lateral groove, a groove bottom is raised to form a tie bar connecting the blocks that are adjacent to each other in the tire circumferential direction. The tie bar includes a groove portion that penetrates the tie bar in the tire axial direction. In a state where the tire is assembled to a regular rim, filled with a regular internal pressure, loaded with a regular load, and brought into contact with a flat surface at a camber angle 0°, a side wall formed on the tie bar by the groove portion on one side in the tire circumferential direction is not in contact with a side wall on the other side in the tire circumferential direction.

In addition, the disclosure provides a tire including a tread. The tread includes: a plurality of circumferential grooves extending continuously in a tire circumferential direction; a plurality of lateral grooves connecting the circumferential grooves that are adjacent to each other in a tire axial direction; and a plurality of blocks divided by the circumferential grooves and the lateral grooves. In the lateral groove, a groove bottom is raised to form a tie bar connecting the blocks that are adjacent to each other in the tire circumferential direction. The tie bar includes a groove portion that penetrates the tie bar in the tire axial direction, and a width of the groove portion is 2 mm or more.

DESCRIPTION OF THE EMBODIMENTS

In view of the above situation, the disclosure provides a tire that has improved mud performance and maintains steering stability.

The disclosure provides a tire including a tread. The tread includes: a plurality of circumferential grooves extending continuously in a tire circumferential direction; a plurality of lateral grooves connecting the circumferential grooves that are adjacent to each other in a tire axial direction; and a plurality of blocks divided by the circumferential grooves and the lateral grooves. In the lateral groove, a groove bottom is raised to form a tie bar connecting the blocks that are adjacent to each other in the tire circumferential direction. The tie bar includes a groove portion that penetrates the tie bar in the tire axial direction. In a state where the tire is assembled to a regular rim, filled with a regular internal pressure, loaded with a regular load, and brought into contact with a flat surface at a camber angle 0°, a side wall formed on the tie bar by the groove portion on one side in the tire circumferential direction is not in contact with a side wall on the other side in the tire circumferential direction.

In addition, the disclosure provides a tire including a tread. The tread includes: a plurality of circumferential grooves extending continuously in a tire circumferential direction; a plurality of lateral grooves connecting the circumferential grooves that are adjacent to each other in a tire axial direction; and a plurality of blocks divided by the circumferential grooves and the lateral grooves. In the lateral groove, a groove bottom is raised to form a tie bar connecting the blocks that are adjacent to each other in the tire circumferential direction. The tie bar includes a groove portion that penetrates the tie bar in the tire axial direction, and a width of the groove portion is 2 mm or more.

In the tire according to the disclosure, the tie bar may include a stepped region having at least one step, a height of which increases stepwise from a bottom portion of the groove portion to a top of the tie bar.

In the tire according to the disclosure, the number of steps of the stepped region may be one.

In the tire according to the disclosure, a height of the bottom portion from the groove bottom of the lateral groove may be 20% or less of a maximum depth of the lateral groove.

In the tire according to the disclosure, a depth from the top to the bottom portion may be 0 mm to 0.5 mm larger than the height of the bottom portion from the groove bottom of the lateral groove.

In the tire according to the disclosure, a center of the tie bar in the tire axial direction may be arranged in a region of ±2 mm or less in the tire axial direction with respect to a ground contact center of the block in the tire axial direction.

In the tire according to the disclosure, a width of the tie bar in the tire axial direction may be 10% to 40% of a tire axial direction length of a groove edge that extends along the lateral groove of the block.

In the tire according to the disclosure, the width of the tie bar in the tire axial direction may be 20% to 30% of the tire axial direction length of the groove edge that extends along the lateral groove of the block.

In the tire according to the disclosure, the circumferential grooves may include an inner circumferential groove extending on an inner side in the tire axial direction, and an outer circumferential groove extending on an outer side in the tire axial direction. The tread may further include: a plurality of shoulder lateral grooves connecting the outer circumferential groove and a tread ground contact end; and a plurality of shoulder blocks divided by the outer circumferential groove, the tread ground contact end, and the shoulder lateral grooves.

In the tire according to the disclosure, the lateral groove and the shoulder lateral groove that are adjacent to each other in the tire axial direction on both sides of the outer circumferential groove may overlap in the tire circumferential direction at least in part.

For the tire of the disclosure, the tread includes the circumferential grooves and the lateral grooves, the blocks divided by the circumferential grooves and the lateral grooves, and the tie bar formed by raising the groove bottom in the lateral groove. As the blocks adjacent to each other in the tire circumferential direction are connected by the tie bar, the rigidity of the block in the tire circumferential direction is enhanced and excellent steering stability is easily realized.

The tie bar is formed with the groove portion. The groove portion penetrates the tie bar in the tire axial direction. The side wall on one side, which is formed on the tie bar by the groove portion, is not in contact with the side wall on the other side when the tire is loaded with a regular load, so that the volume of the lateral groove is sufficiently secured and the mud performance of the tread is improved.

In addition, by setting the width of the groove portion to 2 mm or more, even when the tread surface is under longitudinal and lateral forces during running, the volume of the lateral groove is sufficiently secured easily and the mud performance of the tread is improved.

Figure 1:
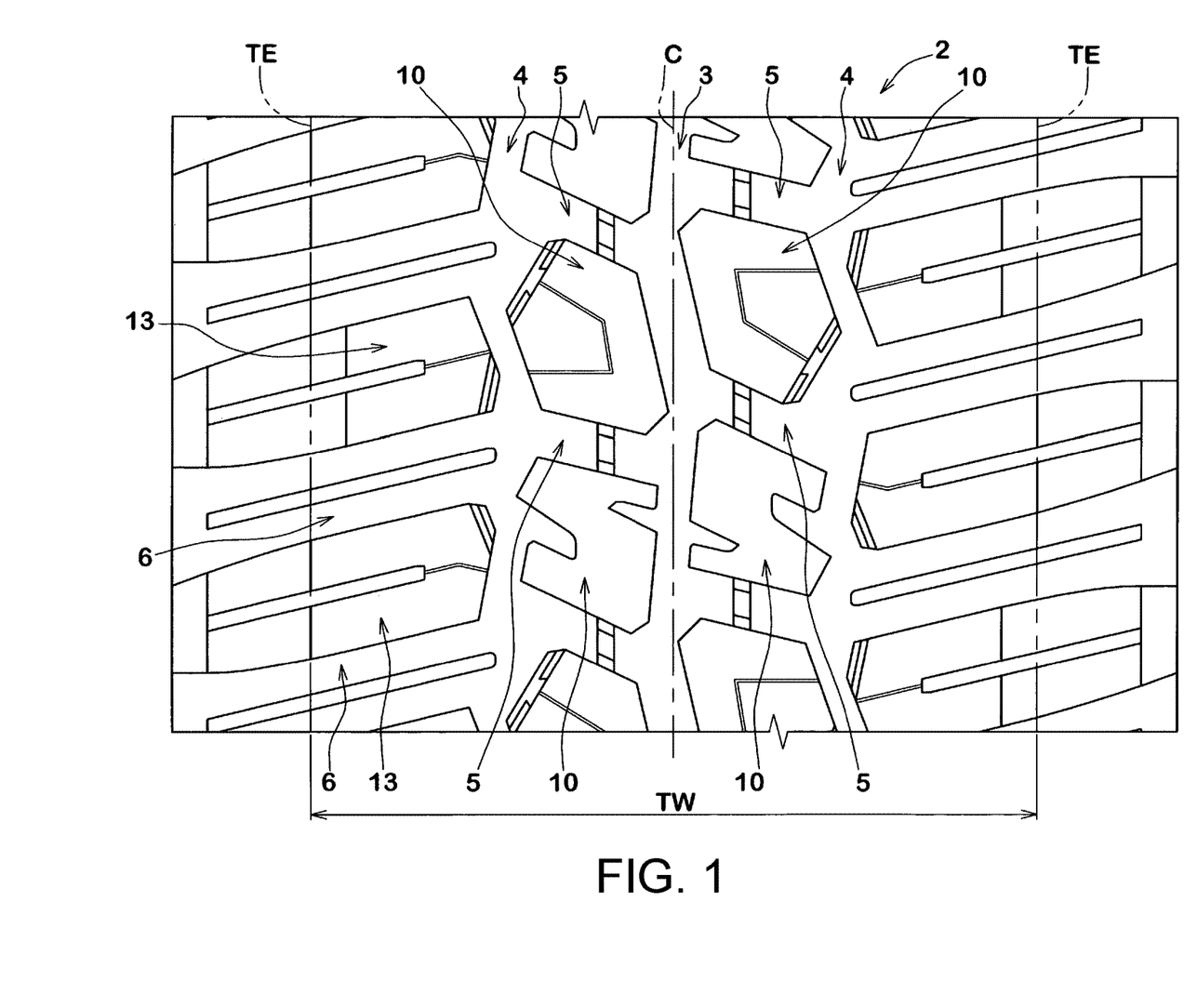
FIG. 1 is an expanded view of the tread showing an embodiment of the tire of the disclosure.

Hereinafter, an embodiment of the disclosure will be described based on the drawings. FIG. 1 is an expanded view of a tread 2 of a tire according to the present embodiment. The tire of the present embodiment has the tread 2.

As shown in FIG. 1, the tread 2 is formed with a circumferential groove 3, a plurality of circumferential grooves 4, a plurality of lateral grooves 5, and a plurality of blocks 10.

The circumferential grooves 3 and 4 are adjacent to each other in a tire axial direction and extend continuously in a tire circumferential direction. The circumferential groove 3 of the present embodiment is arranged on a tire equator C and is formed in a zigzag shape. One circumferential groove 4 is arranged on each side of the circumferential groove 3. The circumferential groove 4 is formed in a zigzag shape.

The widths of the circumferential grooves 3 and 4 can be set to various widths according to the convention. For example, for the tire of the present embodiment, the widths of the circumferential grooves 3 and 4 are preferably 3.0% to 8.5% of a tread ground contact width TW. The depths of the circumferential grooves 3 and 4 can be set to various depths according to the convention. For example, for the tire of the present embodiment, the depths of the circumferential grooves 3 and 4 are preferably 10 mm to 20 mm, for example. Nevertheless, the dimensions of each of the circumferential grooves 3 and 4 are not limited to such ranges.

The tread ground contact width TW is defined as the distance in the tire axial direction between the tread ground contact ends TE and TE in a regular state.

Here, the "regular state" refers to a load-free state where the tire is assembled to a regular rim (not shown) and filled with a regular internal pressure. Hereinafter, the dimensions of each part of the tire are values measured in this regular state unless otherwise specified.

The "regular rim" refers to a rim specified by the standard for each tire in a standard system including the standard on which the tire is based. For example, "standard rim" is for JATMA (Japan Automobile Tire Manufacturers Association). "Design Rim" is for TRA (Tire and Rim Association), and "Measuring Rim" is for ETRTO (European Tire and Rim Technical Organization).

The "regular internal pressure" refers to an air pressure specified by the standard for each tire in a standard system including the standard on which the tire is based. "Maximum air pressure" is for JATMA. The maximum value described in the table "TIRE LOAD LIMITS AT VARIOUS COLD INFLATION PRESSURES" is for TRA. "INFLATION PRESSURE" is for ETRTO. If the tire is for a passenger car, the regular internal pressure is 180 kPa, for example.

The tread ground contact end TE refers to a tread ground contact end on the outermost side in the tire axial direction when the tire in the regular state is loaded with a regular load and is in contact with a flat surface at a camber angle 0° (hereinafter, referred to as a regular load state). In the regular state, the distance between the tread ground contact ends TE and TE in the tire axial direction is defined as the tread ground contact width TW.

The "regular load" refers to a load specified by the standard for each tire in a standard system including the standard on which the tire is based. "Maximum load capacity" is for JATMA. The maximum value described in the table "TIRE LOAD LIMITS AT VARIOUS COLD INFLATION PRESSURES" is for TRA. "LOAD CAPACITY" is for ETRTO. If the tire is for a passenger car, the regular load is a load corresponding to 88% of the load described above, for example.

The lateral grooves 5 extend in the tire axial direction and connect the circumferential grooves 3 and 4 adjacent to each other in the tire axial direction. A plurality of lateral grooves 5 are formed in the land parts divided by the circumferential grooves 3 and 4 and are arranged in the tire circumferential direction. The lateral grooves 5 of the present embodiment extend in the tire axial direction and are inclined with respect to the tire axial direction.

Figure 2:
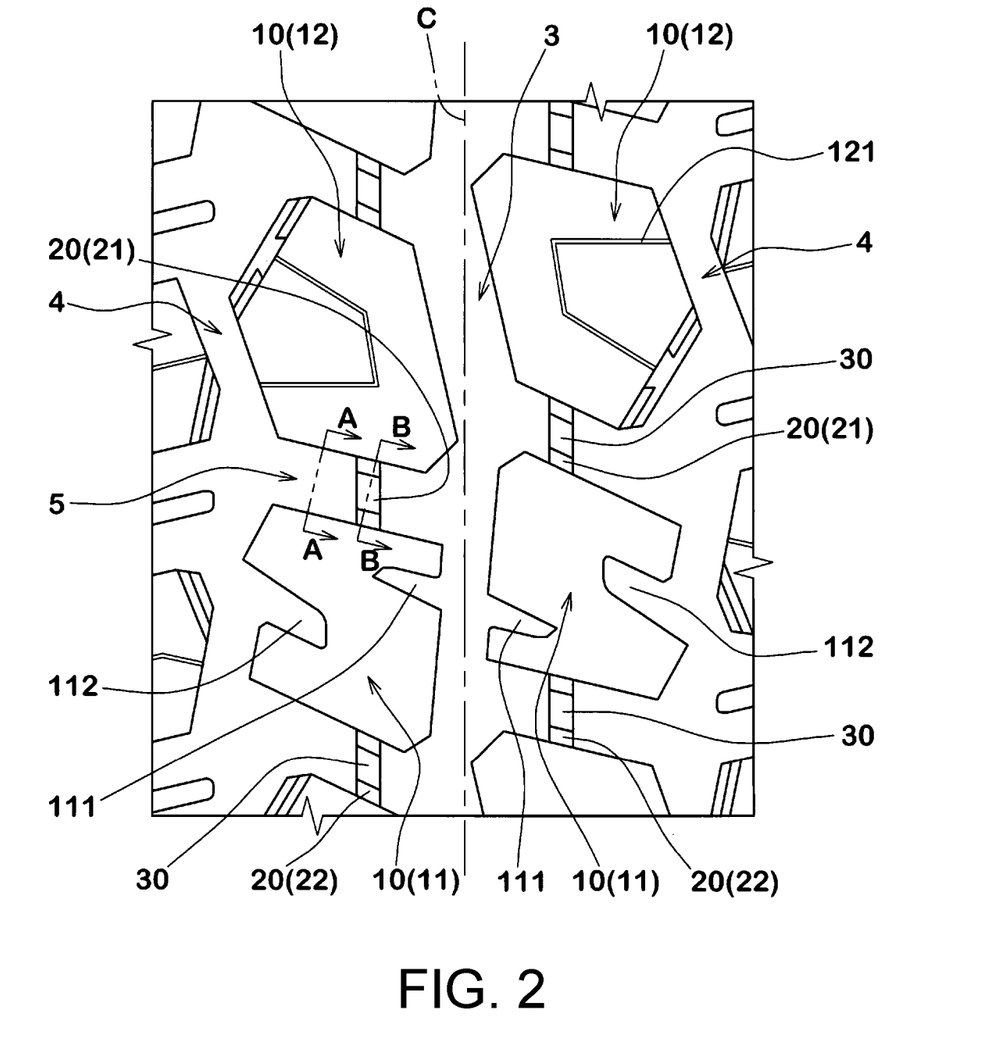
FIG. 2 is an expanded view enlarging the area around the tire equator of the tread of FIG. 1.

FIG. 2 is an enlarged view of the blocks 10, the circumferential grooves 3 and 4, and the lateral grooves 5 disposed near the tire equator C. The blocks 10 are divided by the circumferential grooves 3 and 4 and the lateral grooves 5. A plurality of blocks 10 are formed and arranged in the tire circumferential direction. The blocks 10 include a plurality of blocks 11 and a plurality of blocks 12 that have different shapes.

The blocks 11 and the blocks 12 are alternately arranged in the tire circumferential direction. In addition, a pair of blocks 11 are arranged side by side in the tire axial direction on both sides of the tire equator. Furthermore, a pair of blocks 12 are arranged side by side in the tire axial direction on both sides of the tire equator.

The block 11 is formed with a notch 111 and a notch 112. The notch 111 extends from the inner edge of the block 11 in the tire axial direction toward the outer side in the tire axial direction and ends in the block 11. The notch 112 extends from the outer edge of the block 11 in the tire axial direction toward the inner side in the tire axial direction and ends in the block 11. The notch 111 and the notch 112 improve the mud performance of the tread 2.

The block 12 is formed with a curved sipe 121 that is open to the circumferential groove 4 at both ends. The curved sipe 121 is bent in the block 12. The curved sipe 121 optimizes the rigidity of the block 12.

Figure 3:
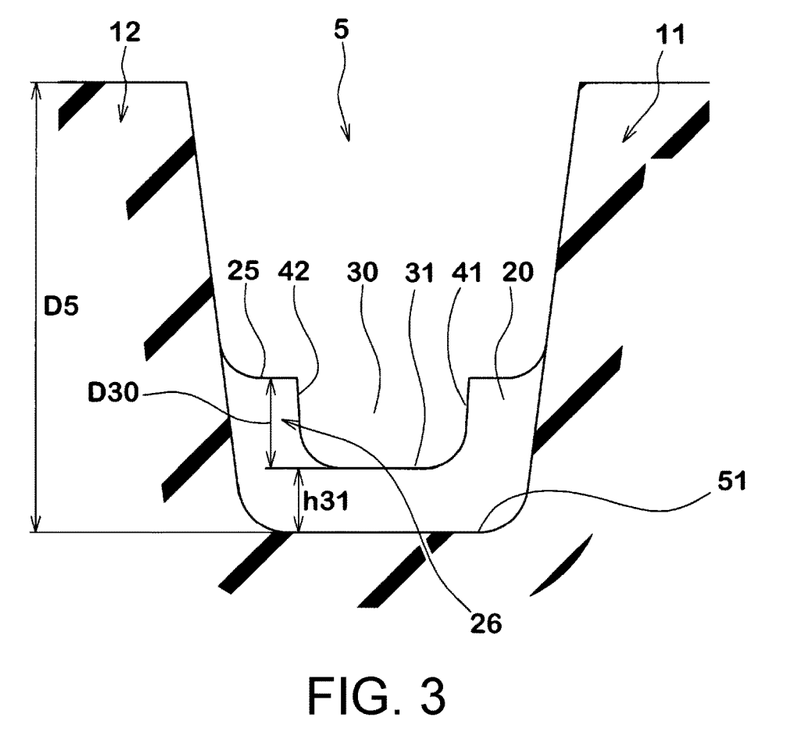
FIG. 3 is a cross-sectional view taken along the line A-A of FIG. 2.
Figure 4:
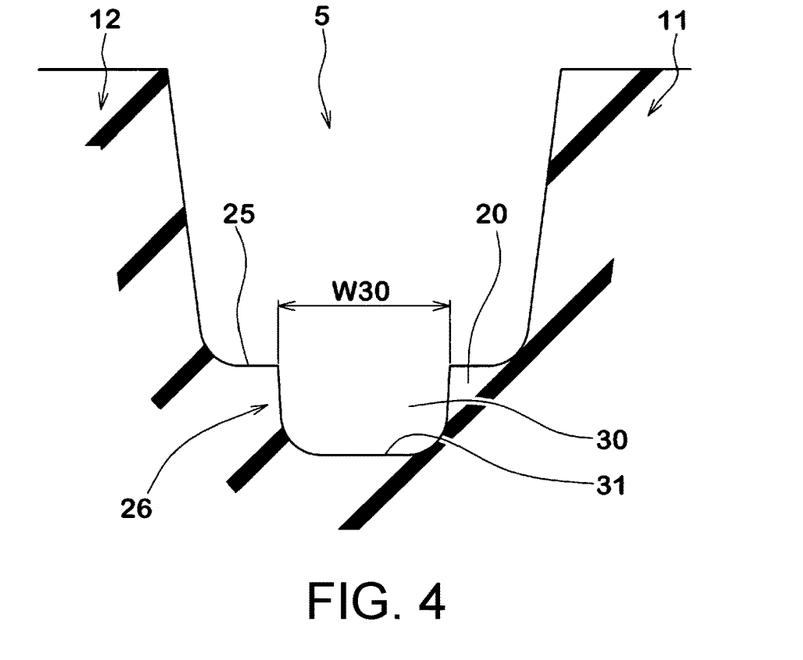
FIG. 4 is a cross-sectional view taken along the line B-B of FIG. 2.

FIG. 3 shows a cross-sectional view taken along the line A-A across the lateral groove 5 in FIG. 2. FIG. 4 shows another cross-sectional view taken along the line B-B across the lateral groove 5 in FIG. 2.

As shown in FIG. 2 to FIG. 4, a tie bar 20 is formed in the lateral groove 5. The tie bar 20 is formed by raising a part of the groove bottom 51 in the lateral groove 5 to connect the blocks 10 that are adjacent to each other in the tire circumferential direction (that is, the block 11 and the block 12). Such a tie bar 20 enhances the rigidity of the block 10 in the tire circumferential direction and easily realizes excellent steering stability.

A groove portion 30 is formed in the tie bar 20. The groove portion 30 of the present embodiment extends in parallel to the lateral groove 5, that is, inclined with respect to the tire axial direction.

The groove portion 30 penetrates the tie bar 20 in the tire axial direction. By forming the groove portion 30 in the tie bar 20, the volume of the lateral groove 5 is easily secured and the mud performance of the tread 2 is improved.

As the groove portion 30 is formed in the tie bar 20, the tie bar 20 is formed with a side wall 41 on one side in the tire circumferential direction and a side wall 42 on the other side in the tire circumferential direction. That is, the side wall 41 and the side wall 42 face each other with the groove portion 30 in between.

In the present embodiment, the side wall 41 and the side wall 42 are not in contact with each other in the above-described regular load state, so that the volume of the lateral groove 5 is sufficiently secured and the mud performance of the tread 2 is improved. In the present embodiment, each of the side walls 41, 42 is flat.

In addition, the width W30 of the groove portion 30 is 2 mm or more. By setting the width W30 to 2 mm or more, even when the tread surface is under longitudinal and lateral forces during running, the volume of the lateral groove 5 is sufficiently secured easily and the mud performance of the tread 2 is improved.

The tie bar 20 of the present embodiment is provided with a stepped region 26 having at least one step, the height of which increases stepwise from the bottom portion 31 of the groove portion 30 toward the top 25 of the tie bar 20. The edge component of the stepped region 26 enhances the effect of scratching mud in the lateral groove 5 and further improves the mud performance of the tread 2.

In the present embodiment, the number of steps of the stepped region 26 is one. Thereby, the volume of the lateral groove 5 is easily secured.

The height h31 of the bottom portion 31 from the groove bottom 51 of the lateral groove 5 is preferably 20% or less of the maximum depth D5 of the lateral groove 5. By setting the height h31 to 20% or less of the maximum depth D5, the volume of the groove portion 30 is easily secured and the mud performance of the tread 2 is improved. Moreover, the rigidity of the block 10 in the tire circumferential direction is prevented from being enhanced excessively, so that the width of the lateral groove 5 during kicking is increased and the soil removal property is improved. Thereby, the mud performance of the tread 2 is further improved.

The depth D30 of the groove portion 30 from the top 25 to the bottom portion 31 is preferably 0 mm to 0.5 mm larger than the height h31 of the bottom portion 31 from the groove bottom 51 of the lateral groove 5.

By setting the depth D30 larger than the height h31, the volume of the groove portion 30 is easily secured and the mud performance is improved. In addition, the soil removal property of the lateral groove 5 is improved and the mud performance is further improved. However, the depth D30 is not larger than the height h31 over 0.5 mm, so that the rigidity of the block 10 in the tire circumferential direction is easily enhanced and excellent steering stability is easily realized.

Figure 5:
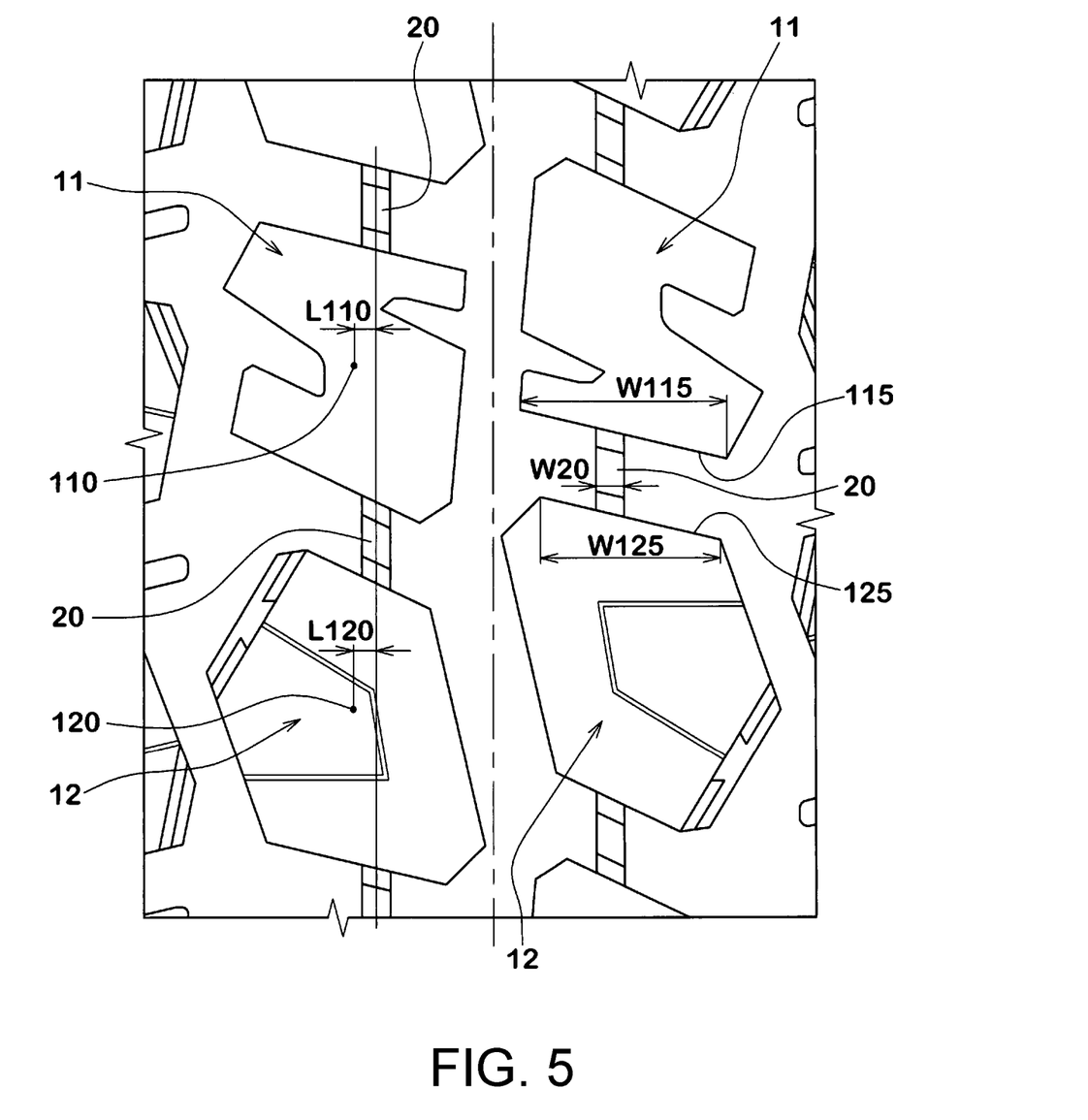
FIG. 5 is an expanded view further enlarging FIG. 2.

FIG. 5 is a further enlarged view of the block 11, the block 12, and the tie bar 20. The tie bar 20 of the present embodiment extends in parallel to the tire circumferential direction.

The center of the tie bar 20 in the tire axial direction is preferably arranged in a region of ±2 mm or less in the tire axial direction with respect to the ground contact center 110 of the block 11 in the tire axial direction. That is, the distance L110 in the tire axial direction between the center of the tie bar 20 in the tire axial direction and the ground contact center 110 of the block 11 in the tire axial direction is preferably 2 mm or less. Thereby, the difference in rigidity between a region of the block 11 close to the tie bar 20 and a region of the block 11 away from the tie bar 20 can be reduced, and excellent steering stability is easily realized.

In the present embodiment, the tie bar 20 is arranged on the inner side in the tire axial direction with respect to the ground contact center 110 of the block 11 in the tire axial direction. Thereby, the rigidity of the block 11 is enhanced near the tire equator C where the ground contact pressure tends to be high, and excellent steering stability is easily realized.

The positional relationship between the tie bar 20 and the ground contact center 120 of the block 12 in the tire axial direction is the same as above. For example, the distance L120 in the tire axial direction between the center of the tie bar 20 in the tire axial direction and the ground contact center 120 of the block 12 in the tire axial direction is preferably 2 mm or less.

The width W20 of the tie bar 20 in the tire axial direction is preferably 10% to 40% of the tire axial direction length W115 of the groove edge 115 that extends along the lateral groove 5 of the block 11.

By setting the width W20 to 10% or more of the length W115, the rigidity of the block 11 is easily enhanced and excellent steering stability is easily realized. Further, by setting the width W20 to 40% or less of the length W115, with the presence of the groove portion 30, the volume of the lateral groove 5 is easily secured and the mud performance of the tread 2 is improved. From the above viewpoint, the width W20 is more preferably 20% to 30% of the length W115.

The relationship between the width W20 of the tie bar 20 and the tire axial direction length W125 of the groove edge 125 that extends along the lateral groove 5 of the block 12 is also the same as above.

As shown in FIG. 2, the tie bars 20 of the present embodiment include a tie bar 21 disposed on one side of the block 11 in the tire circumferential direction, and a tie bar 22 disposed on the other side. The features of the tie bar 20 described above apply to both the tie bar 21 and the tie bar 22. That is, the groove portion 30 is formed in the tie bar 21 and the tie bar 22.

As shown in FIG. 1, the circumferential groove 3, among the circumferential grooves 3 and 4, is an inner circumferential groove that extends on the inner side in the tire axial direction. On the other hand, the circumferential groove 4, among the circumferential grooves 3 and 4, is an outer circumferential groove that extends on the outer side in the tire axial direction. Then, in the tread 2, a plurality of shoulder lateral grooves 6 that extend in the tire axial direction are formed in a region further on the outer side of the circumferential groove 4 in the tire axial direction. The shoulder lateral grooves 6 connect the circumferential groove 4 with the tread ground contact end TE.

A plurality of shoulder blocks 13 are formed on the outer side of the circumferential groove 4 in the tire axial direction. The shoulder blocks 13 are divided by the circumferential groove 4, the tread ground contact end TE, and the shoulder lateral grooves 6.

The lateral groove 5 and the shoulder lateral groove 6 that are adjacent to each other in the tire axial direction on both sides of the circumferential groove 4 preferably overlap in the tire circumferential direction at least in part. Such lateral groove 5 and shoulder lateral groove 6 function integrally as a series of lateral grooves. Then, the "+" shaped grooves configured with the circumferential groove 4 improves the mud performance of the tread 2.

Figure 6:
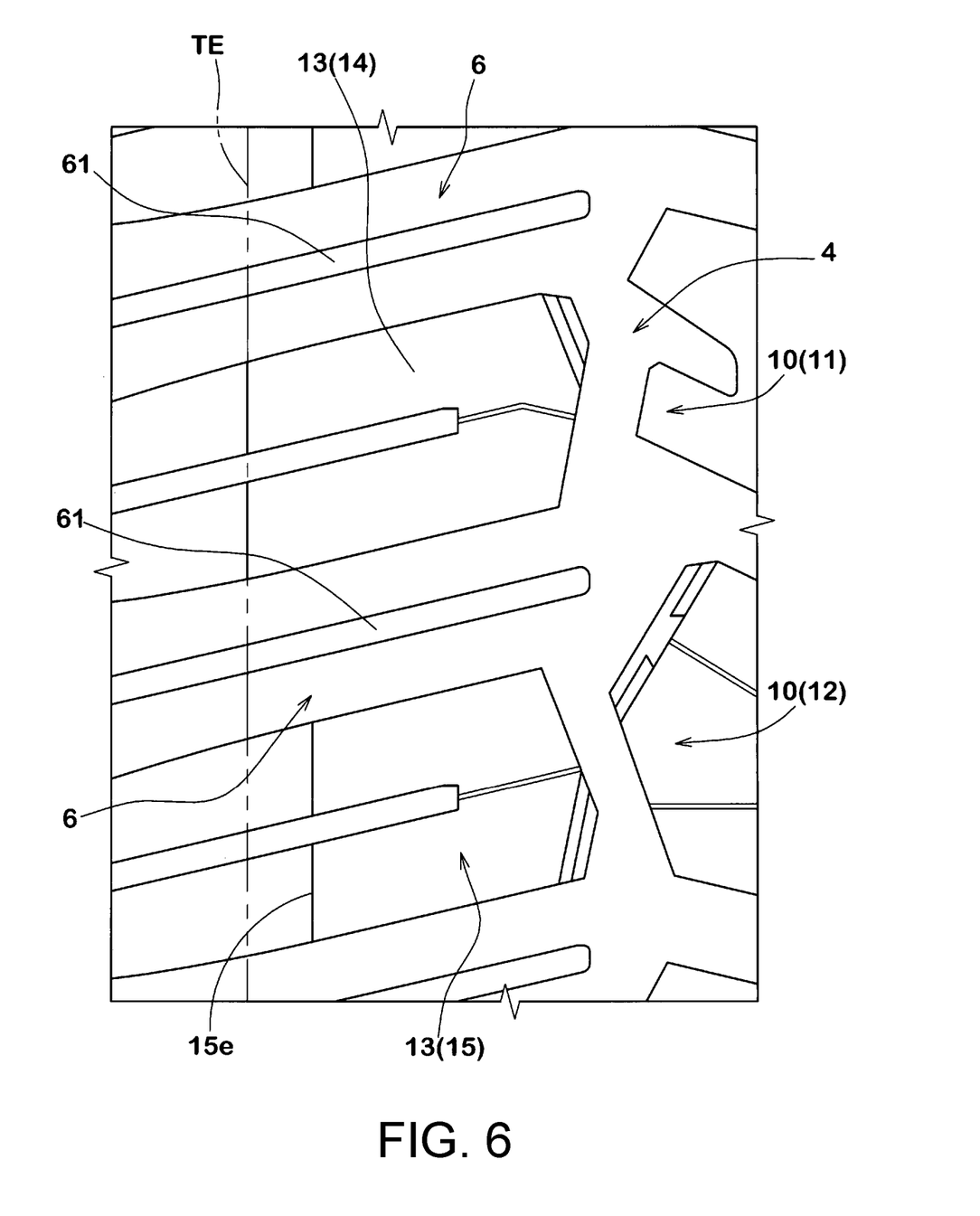
FIG. 6 is an expanded view enlarging the shoulder blocks of FIG. 1 and the area around.

FIG. 6 shows a configuration of the shoulder blocks 13 and the area around. The shoulder blocks 13 include a plurality of shoulder blocks 14 and a plurality of shoulder blocks 15 that have different shapes. The shoulder blocks 14 and the shoulder blocks 15 are alternately arranged in the tire circumferential direction.

The shoulder block 14 and the block 11 are adjacent to each other in the tire axial direction on both sides of the circumferential groove 4. The shoulder block 15 and the block 12 are adjacent to each other in the tire axial direction on both sides of the circumferential groove 4. The length of the shoulder block 15 in the tire axial direction is smaller than the length of the shoulder block 14 in the tire axial direction, and the outer edge 15e of the shoulder block 15 in the tire axial direction is positioned on the inner side of the tread ground contact end TE in the tire axial direction. Such shoulder block 14 and shoulder block 15 improve the mud performance of the tread 2.

In the shoulder lateral groove 6, a ridge 61 is formed by raising the groove bottom. The ridge 61 extends in the tire axial direction. Such a ridge 61 enhances the effect of scratching mud in the shoulder lateral groove 6 and improves the mud performance of the tread 2.

Although the tire of the disclosure has been described in detail above, the disclosure is not limited to the above-described specific embodiments and may be changed into various forms for implementation. For example, the block 11 and the block 12 may have the same shape. In addition, the shoulder block 14 and the shoulder block 15 may have the same shape.

Embodiments

Pneumatic tires of the size of 265/70R17 having the basic pattern of FIG. 1 were prototyped based on the specifications of Table 1 and mounted on all the wheels of a 2400 cc four-wheel drive vehicle via rims of the size of 17×8.0 at an air pressure of 340 kPa for testing the steering stability and mud performance. The test method is as follows.

<Steering Stability>

The above-described vehicle was brought into a straight road of a test course of pavement (dry road surface), and the steering stability of the vehicle running on a round course was evaluated by the driver's sense. Regarding the result, with the score of the comparative example set as 100, a larger value indicates better steering stability.

<Mud Performance>

The performance of the above test vehicle running on a muddy ground was evaluated by the driver's sense. Regarding the result, with the score of the comparative example set as 100, a larger value indicates better mud performance.

TABLE 1

|  | Comparative example | Embodiment 1 | Embodiment 2 | Embodiment 3 | Embodiment 4 | Embodiment 5 |
| --- | --- | --- | --- | --- | --- | --- |
| Tie bar | Yes | Yes | Yes | Yes | Yes | Yes |
| Groove portion | No | Yes | Yes | Yes | Yes | Yes |
| W30 (mm) | — | 7 | 1 | 2 | 7 | 7 |
| h31/D5 (%) | — | 20 | 20 | 20 | 10 | 30 |
| D30 − h31 (mm) | — | 0.3 | 0.3 | 0.3 | 0.3 | 0.3 |
| L110 (mm) | 0 | 0.0 | 0.0 | 0.0 | 0.0 | 0.0 |
| L120 (mm) | 0 | 0.0 | 0.0 | 0.0 | 0.0 | 0.0 |
| W20/W115 (%) | 25 | 25 | 25 | 25 | 25 | 25 |
| W20/W125 (%) | 25 | 25 | 25 | 25 | 25 | 25 |
| Steering stability (score) | 100 | 95 | 100 | 98 | 90 | 100 |
| Mud performance (score) | 100 | 115 | 110 | 112 | 120 | 110 |

|  | Embodiment 6 | Embodiment 7 | Embodiment 8 | Embodiment 9 | Embodiment 10 | Embodiment 11 |
| --- | --- | --- | --- | --- | --- | --- |
| Tie bar | Yes | Yes | Yes | Yes | Yes | Yes |
| Groove portion | Yes | Yes | Yes | Yes | Yes | Yes |
| W30 (mm) | 7 | 7 | 7 | 7 | 7 | 7 |
| h31/D5 (%) | 20 | 20 | 20 | 20 | 20 | 20 |
| D30 − h31 (mm) | 0.0 | 0.5 | 0.7 | 0.3 | 0.3 | 0.3 |
| L110 (mm) | 0.0 | 0.0 | 0.0 | 2.0 | 3.0 | 0.0 |
| L120 (mm) | 0.0 | 0.0 | 0.0 | 2.0 | 3.0 | 0.0 |
| W20/W115 (%) | 25 | 25 | 25 | 25 | 25 | 5 |
| W20/W125 (%) | 25 | 25 | 25 | 25 | 25 | 5 |
| Steering stability (score) | 98 | 95 | 93 | 93 | 91 | 92 |
| Mud performance (score) | 112 | 115 | 117 | 115 | 115 | 118 |

TABLE 1-continued

|  | Embodiment 12 | Embodiment 13 | Embodiment 14 | Embodiment 15 | Embodiment 16 |
| --- | --- | --- | --- | --- | --- |
| Tie bar | Yes | Yes | Yes | Yes | Yes |
| Groove | Yes | Yes | Yes | Yes | Yes |
| W30 (mm) | 7 | 7 | 7 | 7 | 7 |
| h31/D5 (%) | 20 | 20 | 20 | 20 | 20 |
| D30 − h31 (mm) | 0.3 | 0.3 | 0.3 | 0.3 | 0.3 |
| L110 (mm) | 0.0 | 0.0 | 0.0 | 0.0 | 0.0 |
| L120 (mm) | 0.0 | 0.0 | 0.0 | 0.0 | 0.0 |
| W20/W115 (%) | 10 | 20 | 30 | 40 | 50 |
| W20/W125 (%) | 10 | 20 | 30 | 40 | 50 |
| Steering stability (score) | 93 | 94 | 96 | 97 | 98 |
| Mud performance (score) | 117 | 116 | 114 | 113 | 112 |

As clear from Table 1, it was confirmed that, in comparison with the comparative example, the steering stability and mud performance of the tires of the embodiments were significantly improved in a well-balanced manner.

What is claimed is:

1. A tire comprising a tread, wherein:
   the tread comprises:
   a plurality of circumferential grooves extending continuously in a tire circumferential direction;
   a plurality of lateral grooves connecting the circumferential grooves that are adjacent to each other in a tire axial direction; and
   a plurality of blocks divided by the circumferential grooves and the lateral grooves,
   wherein in one of the plurality of lateral grooves, a groove bottom is raised to form a tie bar connecting the blocks that are adjacent to each other in the tire circumferential direction,
   wherein the tie bar is the only tie bar in the one of the plurality of lateral grooves,
   the tie bar comprises two edges opposite to each other and a groove portion that penetrates the tie bar from one of the edges to another one of the edges in the tire axial direction, and
   in a state where the tire is assembled to a regular rim, filled with a regular internal pressure, loaded with a regular load, and brought into contact with a flat surface at a camber angle 0°, a side wall formed on the tie bar by the groove portion on one side in the tire circumferential direction is not in contact with a side wall on the other side in the tire circumferential direction,
   wherein each of the side walls is flat.

2. The tire according to claim 1, wherein the tie bar comprises a stepped region having at least one step, a height of which increases stepwise from a bottom portion of the groove portion to a top of the tie bar.

3. The tire according to claim 2, wherein the number of steps of the stepped region is one.

4. The tire according to claim 2, wherein a height of the bottom portion from the groove bottom of the lateral groove is 20% or less of a maximum depth of the one of the plurality of lateral grooves.

5. The tire according to claim 2, wherein a depth from the top to the bottom portion is 0 mm to 0.5 mm larger than the height of the bottom portion from the groove bottom of the one of the plurality of lateral grooves.

6. The tire according to claim 1, wherein a center of the tie bar in the tire axial direction is arranged in a region of ±2 mm or less in the tire axial direction with respect to a ground contact center of an adjacent one of the plurality of blocks in the tire axial direction.

7. The tire according to claim 1, wherein a width of the tie bar in the tire axial direction is 10% to 40% of a tire axial direction length of a groove edge that extends along the one of the plurality of lateral grooves of an adjacent one of the plurality of blocks.

8. The tire according to claim 7, wherein the width of the tie bar in the tire axial direction is 20% to 30% of the tire axial direction length of the groove edge that extends along the one of the plurality of lateral grooves of the adjacent one of the plurality of blocks.

9. The tire according to claim 1, wherein the circumferential grooves comprise an inner circumferential groove extending on an inner side in the tire axial direction, and an outer circumferential groove extending on an outer side in the tire axial direction, and
   the tread further comprises:
   a plurality of shoulder lateral grooves connecting the outer circumferential groove and a tread ground contact end; and
   a plurality of shoulder blocks divided by the outer circumferential groove, the tread ground contact end, and the shoulder lateral grooves.

10. The tire according to claim 9, wherein the lateral groove and the shoulder lateral groove that are adjacent to each other in the tire axial direction on both sides of the outer circumferential groove overlap in the tire circumferential direction at least in part.

\* \* \* \* \*